(12) United States Patent
Jurgilewicz

(10) Patent No.: US 7,711,971 B1
(45) Date of Patent: May 4, 2010

(54) MULTI-INPUT POWER SUPPLY SUPERVISOR

(75) Inventor: Robert Peter Jurgilewicz, Pepperell, MA (US)

(73) Assignee: Linear Technology Corporation, Milpitas, CA (US)

( * ) Notice: Subject to any disclaimer, the term of this patent is extended or adjusted under 35 U.S.C. 154(b) by 862 days.

(21) Appl. No.: 11/476,128

(22) Filed: Jun. 28, 2006

(51) Int. Cl.
*G06F 1/00* (2006.01)
*G06F 11/30* (2006.01)

(52) U.S. Cl. .................. 713/340; 713/300; 327/56; 323/243

(58) Field of Classification Search .............. 713/300, 713/340; 327/56; 323/243
See application file for complete search history.

(56) References Cited

U.S. PATENT DOCUMENTS

| | | | | |
|---|---|---|---|---|
| 3,609,565 A | * | 9/1971 | Arnold | 327/62 |
| 3,965,388 A | * | 6/1976 | Brisk | 315/155 |
| 4,473,759 A | * | 9/1984 | Mahabadi | 327/68 |
| 4,590,391 A | * | 5/1986 | Valley | 327/64 |
| 5,369,310 A | * | 11/1994 | Badyal et al. | 327/143 |
| 5,587,866 A | * | 12/1996 | Yach et al. | 361/90 |
| 5,614,857 A | * | 3/1997 | Lim et al. | 327/205 |
| 6,052,006 A | * | 4/2000 | Talaga et al. | 327/143 |
| 6,084,383 A | * | 7/2000 | Borinsky et al. | 323/268 |
| 6,304,088 B1 | * | 10/2001 | Yee | 324/433 |
| 7,382,167 B1 | * | 6/2008 | Umminger et al. | 327/76 |

* cited by examiner

*Primary Examiner*—Thomas Lee
*Assistant Examiner*—Jaweed A Abbaszadeh
(74) *Attorney, Agent, or Firm*—McDermott Will & Emery LLP

(57) ABSTRACT

A system for monitoring multiple power supply signals with respect to a threshold has multiple inputs for receiving input power supply signals. A processing circuit of the system produces an output signal at a first level when the power supply signals have a prescribed relationship to a threshold value, and produces the output signal at a second level when at least one of the input power supply signals does not have the prescribed relationship to the threshold value. The processing circuit is configured for selecting the first level corresponding to a level of an input power supply signal at a pre-selected one of the inputs.

18 Claims, 1 Drawing Sheet

MULTI-INPUT POWER SUPPLY SUPERVISOR

TECHNICAL FIELD

This disclosure relates to power supply systems, and more particularly, to a multi-input power supply supervisor for monitoring multiple power supply voltages with respect to a threshold voltage.

BACKGROUND ART

Electronic systems may employ a power supply supervisor to indicate when an input power supply voltage is above or below a prescribed threshold. For example, an integrated power-on-reset (POR) device may produce a low logic level at its /RESET output when the input supply voltage is below a prescribed threshold voltage. A high logic level at the /RESET output may be generated when the power supply voltage has been above the threshold level for a defined period of time.

A multi-input power supply supervisor monitors multiple input power supply voltages applied to its respective inputs. It issues a low logic level at its /RESET output when at least one of the input power supply voltages is below the threshold level, and a high logic level when all of the input power supply voltages are above the threshold for a defined period of time.

An output signal produced by a power supply supervisor may be provided to external circuitry. Therefore, logic levels of the output signal must be electrically compatible with the external circuitry. In particular, the designer of a multi-input power supply supervisor often faces the problem of providing an output voltage at a high logic level without knowledge of external circuit characteristics.

A common method used to avoid defining high logic levels in a power supply supervisor is to leave the /RESET output node without an internal "pull-up" structure, i.e. make it an "open-drain" output. Users are required to connect their own "pull-up" devices, such as a resistor, to the output of the supervisor to provide a desired high logic level. However, this method increases system cost and requires larger system area.

Another method used to define a high logic level at the output of the supervisor is to provide a "digital Vcc" pin on the supervisor chip. Users apply a compatible voltage to this pin. The high logic level at the output of the supervisor is pulled up to the voltage defined by the "digital Vcc" pin. However, this method also increases system cost and area.

Also, the designer of a power supply supervisor often faces the problem of specifying power supply order at the supervisor's inputs to maintain compatibility of the power supply supervisor with the applied power supply voltages.

It would be desirable to create a multi-input power supply supervisor that eliminates the need to ascertain the high logic level of an output voltage and to specify the power supply order at its inputs.

SUMMARY OF THE DISCLOSURE

The present disclosure offers a novel system and methodology for monitoring multiple power supply signals with respect to a threshold. In accordance with one aspect of the disclosure, a system for monitoring power supply signals has multiple inputs for receiving input power supply signals. A processing circuit of the system produces an output signal at a first level when the power supply signals have a prescribed relationship to a threshold value, and produces the output signal at a second level when at least one of the input power supply signals does not have the prescribed relationship to the threshold value. The output circuit is configured for selecting the first level corresponding to a level of a power supply signal at a pre-selected input.

In particular, the processing circuit may produce the output signal at the first level when all of the power supply signals are at or above the threshold value, and may produce the output signal at the second level when at least one of the power supply signals is less than the threshold value.

The system may include a reference circuit for producing the threshold signal based on one of the input power supply signals. For example, the threshold signal may be produced in response to the maximum signal selected from the input power supply signals.

In accordance with an embodiment of the disclosure, the processing circuit may comprise multiple comparators responsive to the input power supply signals for comparing adjusted power supply signals proportional to the respective input power supply signals with the threshold value. The output circuit may produce the output signal at the first level when the adjusted power supply signals are at or above the threshold value for a period of time defined by an output delay circuit configured to delay producing the output signal at the first level when the values of the adjusted power supply signals reach the threshold value.

In accordance with another aspect of the disclosure, a power supply supervising system comprises at least first and second inputs for receiving first and second power supply voltages to be compared with a reference voltage, an input voltage comparator for comparing the first and second power supply voltages, and a reference circuit responsive to the input voltage comparator for producing the reference voltage.

The reference circuit may produce the reference voltage based on a maximum power supply voltage selected from the first and the second power supply voltages.

Also, the reference circuit may be configured for producing an enabling signal when the maximum power supply voltage is sufficiently high to produce the reference voltage.

The system may further comprise an output circuit for producing an output signal at a first level when each of the first and second power supply voltages are at or above the reference voltage, and for producing the output signal at a second level when at least one of the first and second power supply voltages is less than the reference voltage. The first level may correspond to a voltage at an input selected among the first and second inputs.

In accordance with an embodiment of the disclosure, the system may further comprise first and second voltage adjustment circuits respectively responsive to the first and second power supply voltages for producing first and second adjusted voltages.

First and second voltage comparators may be provided for respectively comparing the first and second adjusted voltages with the reference voltage.

The first voltage adjustment circuit may comprise:
a first switch controllable to supply the first adjusted voltage to the first voltage comparator when the second power supply voltage exceeds the first power supply voltage,
a second switch controllable to supply the first adjusted voltage to the first voltage comparator when the first power supply voltage exceeds the second power supply voltage,
a first adjustment element coupled between the first input and the first switch,
a second adjustment element coupled between the first adjustment element and the second switch, and
a third adjustment element coupled to the second adjustment element and the second switch.

The second voltage adjustment circuit may comprise:

a first switch controllable to supply the second adjusted voltage to the second voltage comparator when the first power supply voltage exceeds the second power supply voltage, a second switch controllable to supply the second adjusted voltage to the second voltage comparator when the second power supply voltage exceeds the first power supply voltage, a first adjustment element coupled between the second input and the first switch, a second adjustment element coupled between the first adjustment element and the second switch, and a third adjustment element coupled to the second adjustment element and the second switch.

A value of the first adjustment element in the first adjustment circuit may be equal to a value of the first adjustment element in the second adjustment circuit, a value of the second adjustment element in the first adjustment circuit may be equal to a value of the second adjustment element in the second adjustment circuit, and a value of the third adjustment element in the first adjustment circuit may be equal to a value of the third adjustment element in the second adjustment circuit.

In accordance with a method of the present disclosure, the following steps are carried out to monitor multiple power supply signals:

selecting a maximum signal from the multiple power supply signals, producing a reference signal based on the maximum signal, and comparing adjusted signals respectively representing the power supply signals with the reference signal.

The method may further comprises the steps of:

selecting a prescribed power supply signal from the multiple power supply signals, and producing an output signal corresponding to the prescribed power supply signal if each of the adjusted signals is at or above the reference signal.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a two-input power-on-reset (POR) device that has a low logic level at its /RESET output when one of input power supply voltages is below a threshold voltage, and produces a high logic level at the /RESET output when all of the input power supply voltages are not less than the reference voltage for a pre-defined period of time. It will become apparent, however, that the concepts described herein are applicable to any multi-input electronic device that monitors signals at its inputs with respect to a threshold level.

Figures 1A, 1B:
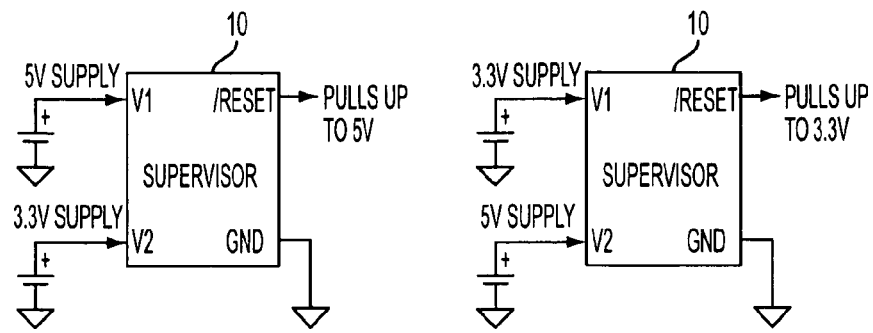
FIGS. 1A and 1B illustrate exemplary applications of a multi-input power supply supervisor of the present disclosure.

FIGS. 1A and 1B show exemplary applications of a multi-input power supply supervisor 10 in accordance with the present disclosure. The power supply supervisor 10 has inputs V1 and V2, and an output /RESET. When at least one of power supply voltages applied to the inputs V1 and V2 is below a threshold voltage, the power supply supervisor 10 produces a signal at the /RESET output at a low logic level. When the power supply voltages at the inputs V1 and V2 are at or above the threshold voltage for a pre-defined period of time, the supervisor 10 produces the /RESET output voltage at a high logic level. The logic level may be opposite, if preferred. As discussed in more detail later, the threshold voltage is generated based on the maximum voltage among the input power supply voltages.

In the application illustrated in the example of FIG. 1A, the input V1 is fed with a 5V power supply voltage, whereas the input V2 is provided with a 3.3 power supply voltage. When the power supply voltages at the inputs V1 and V2 are at or above a threshold voltage for a defined period of time, the supervisor 10 produces a signal at the /RESET output at a high logic level of 5V. As shown in the example of FIG. 1B, when the input V1 is provided with a 3.3V power supply voltage and the input V2 is fed with a 5V power supply voltage, a high logic level of 3.3V may be produced at the /RESET output. Hence, in both applications, the /RESET output is pulled up to the voltage level applied to the input V1. One skilled in the art would recognize that the power supply supervisor 10 may be configured to pull up a high logic level at the /RESET output to a level of a power supply voltage applied to any selected input of the supervisor 10.

Figure 2:
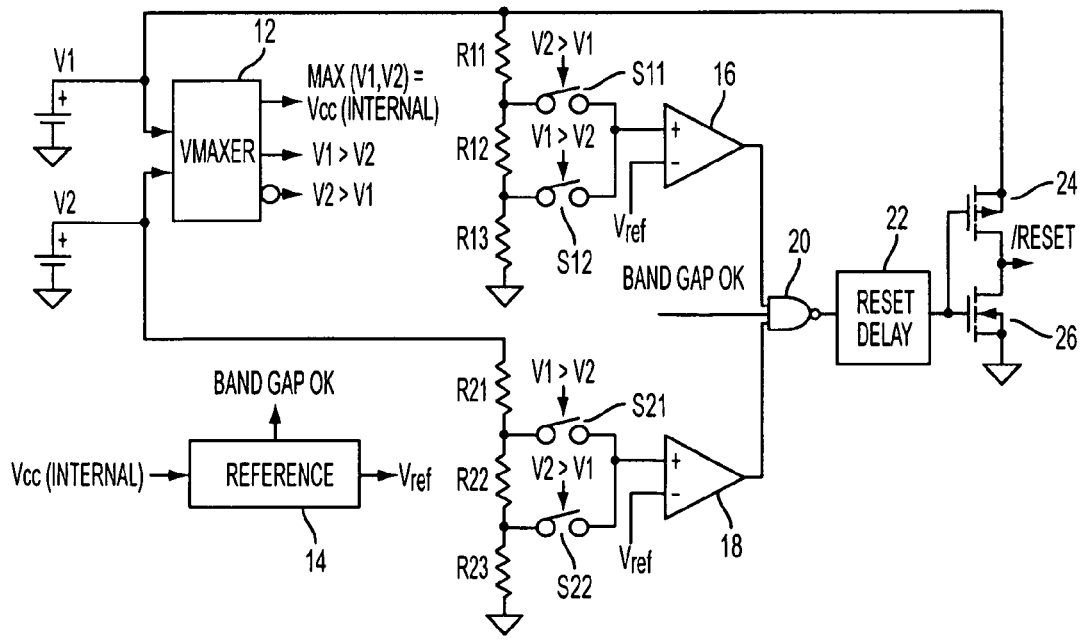
FIG. 2 illustrates an exemplary embodiment of the power supply supervisor of the present disclosure.

FIG. 2 illustrates an exemplary embodiment of the power supply supervisor 10 that may include a maximum voltage detector 12, a reference voltage generator 14, a first power supply voltage adjustment circuit composed of resistors R11, R12 and R13 and switches S11 and S12, a second power supply voltage adjustment circuit composed of resistors R21, R22 and R23 and switches S21 and S22, comparators 16 and 18, an NAND gate 20, a reset delay circuit 22, and a CMOS output driver composed of a P-type MOSFET 24 and an N-type MOSFET 26.

Input power supply voltages V1 and V2 are applied to the maximum voltage detector 12 that compares the power supply voltages and determines the maximum voltage Vcc(internal) from among the power supply voltages. The maximum voltage detector 12 may have a Vcc(internal) output for producing the Vcc(internal) voltage. Also, the maximum voltage detector 12 may be provided with voltage comparison outputs. One of the voltage comparison outputs may be activated when the power supply voltage V1 exceeds the power supply voltage V2, and the other may be activated when the power supply voltage V2 exceeds the power supply voltage V1.

The Vcc(internal) voltage is supplied to the reference voltage generator 14 to produce a reference voltage Vref used as a threshold voltage for monitoring the power supply voltages V1 and V2. For example, the reference voltage generator 14 may be a bandgap voltage reference circuit that produces a bandgap voltage reference based on the maximum voltage Vcc(internal). The bandgap voltage reference circuit may create any suitable output voltage. The bandgap voltage reference is stable in regard to both temperature and power supply variations.

The reference voltage generator 14 may have an enabling output "bandgap OK" activated when the voltage Vcc(internal) is sufficiently high to produce the bandgap voltage reference. The bandgap OK signal is supplied to an input of the NAND gate 20 to enable activation of a high logic level at the /RESET output.

When the power supply voltage V1 exceeds the power supply voltage V2, the respective output signal of the maximum voltage detector 12 controls the switches S12 and S21 to apply adjusted voltages proportional to the power supply voltages V1 and V2 via the switches S12 and S21 to comparators 16 and 18, respectively. When the power supply voltage V2 exceeds the power supply voltage V1, the respective output signal of the maximum voltage detector 12 controls the switches S11 and S22 to apply adjusted voltages proportional to the power supply voltages V1 and V2 via the switches S11 and S22 to the comparators 16 and 18, respectively.

Resistors R11, R12 and R13 may be arranged in voltage dividing circuitry to produce desired values of the adjusted voltages corresponding to the power supply voltage V1 at the switches 511 and S12. In particular, the resistor R11 is connected between the power supply input V1 and the switch S11, the resistor R12 is connected between the resistor R11 and the switch S12, and the resistor R13 is connected between the resistor R12 and the ground.

Similarly, resistors R21, R22 and R23 may be arranged in voltage dividing circuitry to produce desired values of the adjusted voltages corresponding to the power supply voltage V2 at the switches S21 and S22. In particular, the resistor R21 is connected between the power supply input V2 and the switch S21, the resistor R22 is connected between the resistor R21 and the switch S22, and the resistor R23 is connected between the resistor R22 and the ground.

The resistance of R11 may be equal to the resistance of R21, the resistance of R12 may be equal to the resistance of R22, and the resistance of R13 may be equal to the resistance of R23. Particular values of these resistances may be selected to provide desired adjusted values of the input power supply voltages V1 and V2. One skilled in the art would recognize that any impedance elements may be used instead of the resistors.

The comparators 16 and 18 respectively compare the adjusted values of the input power supply voltages V1 and V2 with the reference voltage Vref produced by the reference voltage generator 14. The comparators 16 and 18 may respectively produce output signals at a high logic level when the adjusted values of the power supply voltages V1 and V2 are at or above the reference voltage Vref. The output signals of the comparators 16 and 18 are supplied to respective inputs of the NAND gate 20. As discussed above, the NAND gate 20 may have the other input supplied by the bandgap OK signal. The NAND gate 20 may produce an output signal at a low logic level when all of its inputs are supplied with signals at a high logic level.

To avoid errors due to transient effects, the reset delay circuit 22 is connected to the output of the NAND gate. For example, the reset delay circuit 22 may provide a 200 ms delay. The reset delay circuit 22 may be arranged to provide a delay only in response to a low logic level at its input applied when the adjusted values of the power supply voltages V1 and V2 are at or above the reference voltage Vref. No delay may be produced in response to a high logic level to provide immediate indication of a low power supply voltage condition.

The CMOS output driver composed of the P-type MOSFET 24 and the N-type MOSFET 26 inverts the delayed output signal produced by the reset delay circuit 22 to generate a high logic level signal at the /RESET output of the power supply supervisor 10. The MOSFET 24 is connected to the power supply input V1 to enable the CMOS output driver to produce the output signal at a high logic level corresponding to the power supply voltage V1.

Hence, the power supply supervisor of the present disclosure eliminates the need to pre-specify the voltage corresponding to a high logic level of the output signal. Instead, the supervisor produces an output signal at a high logic level equal to an input power supply voltage applied to a selected input, e.g. input V1.

Also, the power supply supervisor of the present disclosure automatically selects adjusted levels based on differences between input power supply signals. Therefore, there is no need to pre-specify the connection order of power supplies to the supervisor inputs.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for monitoring power supply signals comprising:
   multiple inputs for receiving input power supply signals, and
   a processing circuit configured for producing an output signal at a first level when the power supply signals have a prescribed relationship to a threshold value, and for producing the output signal at a second level when at least one of the input power supply signals does not have the prescribed relationship to the threshold value,
   the processing circuit being further configured for selecting the first level corresponding to a value of an input power supply signal at a pre-selected input of the multiple inputs.

2. The system of claim 1, wherein the processing circuit is configured for producing the output signal at the first level when all of the power supply signals are at or above the threshold value, and for producing the output signal at the second level when at least one of the power supply signals is at less than the threshold value.

3. The system of claim 2, further comprising a reference circuit for producing the threshold value based on one of the input power supply signals.

4. The system of claim 3, wherein the reference circuit is configured for producing the threshold value in response to a maximum signal selected from the input power supply signals.

5. The system of claim 2, wherein the processing circuit comprises multiple comparators responsive to the input power supply signals for comparing adjusted power supply signals proportional to the respective input power supply signals with the threshold value.

6. The system of claim 5, wherein the processing circuit is further configured for producing the output signal at the first level when the adjusted power supply signals are at or above the threshold value.

7. The system of claim 6, further comprising an output delay circuit configured to delay producing the output signal at the first level when the adjusted power supply signals reach the threshold value.

8. A power supply supervising system comprising:
- at least first and second inputs for receiving first and second power supply voltages to be compared with a reference voltage,
- an input voltage comparator for comparing the first and second power supply voltages,
- a reference circuit responsive to the input voltage comparator for producing the reference voltage, the reference circuit being configured to produce the reference voltage based on a maximum power supply voltage selected from the first and the second power supply voltages, and
- an output circuit for producing an output signal at a first level when each of the first and second power supply voltages are at or above the reference voltage, and for producing the output signal at a second level when at least one of the first and second power supply voltages is less than the reference voltage.

9. The system of claim 8, wherein the reference circuit is configured for producing an enabling signal when the maximum power supply voltage is sufficient to produce the reference voltage.

10. The system of claim 8, wherein the output circuit is configured to produce the first level corresponding to a voltage at an input selected from the first and second inputs.

11. The system of claim 8, further comprising first and second voltage adjustment circuits respectively responsive to the first and second power supply voltages for producing first and second adjusted voltages.

12. The system of claim 11, further comprising first and second voltage comparators for respectively comparing the first and second adjusted voltages with the reference voltage.

13. A power supply supervising system comprising:
- at least first and second inputs for receiving first and second power supply voltages to be compared with a reference voltage,
- an input voltage comparator for comparing the first and second power supply voltages,
- a reference circuit responsive to the input voltage comparator for producing the reference voltage, the reference circuit being configured to produce the reference voltage based on a maximum power supply voltage selected from the first and the second power supply voltages,
- an output circuit for producing an output signal at a first level when each of the first and second power supply voltages are at or above the reference voltage, and for producing the output signal at a second level when at least one of the first and second power supply voltages is less than the reference voltage,
- first and second voltage adjustment circuits respectively responsive to the first and second power supply voltages for producing first and second adjusted voltages, and
- first and second voltage comparators for respectively comparing the first and second adjusted voltages with the reference voltage, wherein the first voltage adjustment circuit comprises:
- a first switch controllable to supply the first adjusted voltage to the first voltage comparator when the second power supply voltage exceeds the first power supply voltage, and
- a second switch controllable to supply the first adjusted voltage to the first voltage comparator when the first power supply voltage exceeds the second power supply voltage.

14. The system of claim 13, wherein the first voltage adjustment circuit further comprises:
- a first adjustment element coupled between the first input and the first switch,
- a second adjustment element coupled between the first adjustment element and the second switch, and
- a third adjustment element coupled to the second adjustment element and the second switch.

15. The system of claim 14, wherein the second voltage adjustment circuit comprises:
- a third switch controllable to supply the second adjusted voltage to the second voltage comparator when the first power supply voltage exceeds the second power supply voltage,
- a fourth switch controllable to supply the second adjusted voltage to the second voltage comparator when the second power supply voltage exceeds the first power supply voltage,
- a fourth adjustment element coupled between the second input and the third switch,
- a fifth adjustment element coupled between the fourth adjustment element and the fourth switch, and
- a sixth adjustment element coupled to the fifth adjustment element and the fourth switch.

16. The system of claim 15, wherein the first and second adjustment circuits are configured so as to have:
- a value of the first adjustment element equal to a value of the fourth adjustment element,
- a value of the second adjustment element equal to a value of the fifth adjustment element, and
- a value of the third adjustment element equal to a value of the sixth adjustment element.

17. A method of monitoring multiple power supply signals, comprising the steps of:
- selecting a maximum signal from the multiple power supply signals,
- producing a reference signal based on the maximum signal, and
- comparing adjusted signals respectively representing the power supply signals with the reference signal.

18. The method of claim 17, further comprising the steps of:
- selecting a prescribed power supply signal from the multiple power supply signals, and
- producing an output signal corresponding to the prescribed power supply signal if each of the adjusted signals is at or above the reference signal.

* * * * *